United States Patent
Culbert et al.

Patent Number: 5,696,926
Date of Patent: Dec. 9, 1997

[54] METHOD AND APPARATUS FOR TRANSPARENTLY COMPRESSING DATA IN A PRIMARY STORAGE DEVICE

[75] Inventors: Daniel J. Culbert, Los Altos; Robert V. Welland, Menlo Park, both of Calif.

[73] Assignee: Apple Computer, Inc., Cupertino, Calif.

[21] Appl. No.: 600,416

[22] Filed: Feb. 13, 1996

Related U.S. Application Data

[63] Continuation of Ser. No. 100,742, Jul. 30, 1993.

[51] Int. Cl.⁶ .................................................. G06F 12/08
[52] U.S. Cl. ............................ 395/413; 395/402; 395/432
[58] Field of Search .................................... 395/413, 401, 395/432, 485, 478, 402

[56] References Cited

U.S. PATENT DOCUMENTS

| | | | |
|---|---|---|---|
| 4,984,150 | 1/1991 | Mori | 395/182.03 |
| 5,237,460 | 8/1993 | Miller et al. | 360/8 |
| 5,490,260 | 2/1996 | Miller et al. | 395/427 |
| 5,559,978 | 9/1996 | Spilo | 395/413 |

OTHER PUBLICATIONS

O'Connor, Rory J., "Apple Banking on Newton's Brain", Apr. 22, 1992, San Jose Mercury News.

Weiman, Liza and Moran, Tom, "A Step Toward the Future", Aug. 1992, Macworld Magazine.

Soviero, Marcelle M., "Your World According to Newton", Sep. 1992, Popular Science Magazine.

Abatemarco, Fred, "From the Editor", Sep. 1992, Popular Science Magazine.

*Primary Examiner*—Eddie P. Chan
*Assistant Examiner*—Vincent Yip
*Attorney, Agent, or Firm*—Hickman Beyer & Weaver

[57] ABSTRACT

A system for extending the data capacity of a primary storage device in a computer which utilizes transparent data compression. The system utilizes a compressed memory even within the primary storage device along with a compression/decompression algorithm to extend the memory space. The system also includes a water line or limit within the primary storage device to ensure that memory space is always available.

20 Claims, 12 Drawing Sheets

COMPRESSION

DECOMPRESSION

METHOD AND APPARATUS FOR TRANSPARENTLY COMPRESSING DATA IN A PRIMARY STORAGE DEVICE

This is a continuation of application Ser. No. 08/100,742 filed Jul. 30, 1993 now abandoned.

BACKGROUND OF THE INVENTION

The present invention relates generally to personal computers and more particularly to a system for transparently extending the data capacity of a primary storage device within a personal computer.

As computers become smaller and smaller it becomes more important to provide methods for expanding the physical memory within a computer. In typical desk-top personal computers, some form of mass storage is provided. By way of example, many systems include one or more of a hard disk drive, optical storage and/or floppy disks which may be accessed by the central processing unit (CPU) for data retrieval. However, in laptop, palmtop and pen based computing environments, the amount of available memory may be limited due to cost, power consumption and/or size constraints. Such constraints often lead to the design of computers that do not have extensive secondary storage devices.

In most computer systems, the primary information storage device used by the CPU takes the form of semiconductor based RAM. However, due to cost considerations and the volatility of traditional semiconductor RAM, the primary information storage device is often not large enough to store all of the information a user may wish to access. One traditional method of increasing the apparent primary memory is to implement a virtual memory system. In a virtual memory system, a secondary storage device such as a hard disk is typically used to increase the amount of memory available by swapping data back and forth between the primary storage device and the hard disk via a memory management unit. Although this type of system works effectively for computers which have secondary storage devices, it is not an alternative for smaller computers that lack a secondary storage device.

Referring initially to FIGS. 13-15 a representative memory mapping scheme for a virtual memory system will be described. To understand virtual memory addressing techniques, it is important to understand how the address is divided in conventional virtual memory systems. Each virtual memory address is a multibit number divided into two parts. As seen in FIG. 14 and 15, the first part 200 of the virtual memory address references the number of a "page" that contains the desired information. The second part 202 of the virtual memory address references the location of the specific desired information within the page. That is, the second part 202 provides the offset between the beginning of the page and actual location at which the desired information is stored within the page. When this type of data structure is used, information is typically transferred between the primary and secondary storage devices in page sized blocks.

When a request is made to read information from or write information to a particular virtual address the system first determines whether the referenced page is stored within the physical memory and if so, which page within the physical memory corresponds to the addressed location. This is accomplished by a memory management unit (MMU). The memory management unit maps the virtual address to a physical address in the primary storage device. The desired data is then read from or written into the primary storage device. On the other hand, if the referenced page is not stored within the physical memory a "fault" occurs. When a fault occurs, (i.e. when an attempt to access a page not stored in the physical memory is made) the system suspends operations of the requester and seeks to overcome the fault. This process will be described with reference to FIG. 13. Initially, after a fault has been detected in step 501, the system suspends operation of the requester in step 502. Then an attempt is made to overcome the fault. Conceptually, the system must initially either identify a free page in the physical memory that can be used to receive the information pointed to by the virtual address, or free a selected page in the physical memory. This may be accomplished in step 504 by storing the contents of a selected page of the physical memory in the secondary storage device. At the same time, the memory management unit unmaps the previous virtual address from the selected page of physical memory in step 506. This effectively frees the selected page. Then in step 508 the system locates the desired page that has been referenced by the virtual address and copies it to the free page of the physical memory. After the desired data has been copied into the free page of the primary storage device, the memory management unit maps the virtual address to this newly entered page in step 510. Then, in step 512, the operation of the requester is resumed and the system retries the read or write. This process is then repeated until the read or write operation is successful.

As indicated above, in the desk top computer environment, the old mapped data is oftentimes transferred to a secondary storage device such as a hard disk. However, in smaller computers, this is not possible because of the lack of a secondary storage device. Hence, what is needed is a system for extending the data storage capacity of the primary storage device of a personal computer without the need for secondary storage devices.

SUMMARY OF THE INVENTION

Accordingly, it is an object of the present invention to provide a method and apparatus for extending the data capacity of a primary storage device within a personal computer such that the data within the memory can be preserved while at the same time not requiring a secondary storage device.

To achieve the foregoing and other objects and in accordance with the purpose of the present invention, a method of handling faults in a computer system that includes a primary storage device having a compressed area and a working area is disclosed. The computer system includes a memory management unit for mapping virtual addresses to physical addresses within the working area. A fault is defined to occur when a request is made to the memory management unit to access data at a particular virtual memory address but the memory management unit does not have the requested virtual memory address mapped to physical memory in the primary storage device. The method includes the step of locating the data that corresponds to the requested virtual memory address in the compressed area and determining whether there is sufficient free space in the physical memory to receive the addressed data in decompressed form. When there is not sufficient free space, physical memory space in the working area is released under the condition that the data within the released physical memory space must be stored in compressed form in the compressed area. In ROM based object faults such storage is inherent. In RAM based object faults, it may be necessary to compress the data in the physical memory space to be released. After sufficient space has been released, the data that corresponds to the requested virtual memory address is decompressed and stored in the working area. Finally, a revised map is developed in the memory management unit to reflect the changes in the working area.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

Figure 3A:
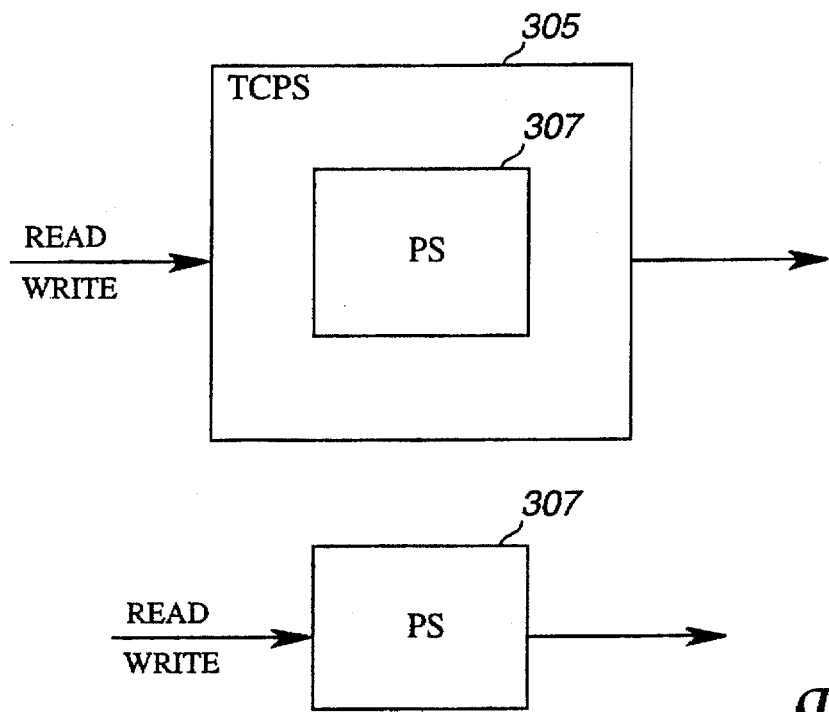
FIG. 3a is a simple block diagram depicting transparent compression.

The present invention relates to methods and apparatus for transparently compressing the data in a primary storage device of a personal computer system in order to virtually extend the primary storage device. For the purposes of this specification transparent compression is intended to mean that the action is invisible to the client of the operating system. That is, it is transparent to any applications, tasks, user interface or other entity that is asking for a read or write to memory. Hence, referring to FIG. 3a, when there is transparent compression of primary storage (TCPS) device 305, access to the TCPS device 305 is identical to access to the primary storage device (PS) 307. What is meant by compression in the context of the present application is increasing the amount of information that is stored in the memory. This can be accomplished through a variety of different known compression techniques such as arithmetic coding, Huffman coding, Lempel-Ziv coding or other suitable schemes. The present invention is well suited for pointer based computer systems such as the pen-based, pen-aware and mouse controlled systems that are currently popular. For the purposes of illustration, the invention will be described in connection with a pen-based system.

Figure 1:
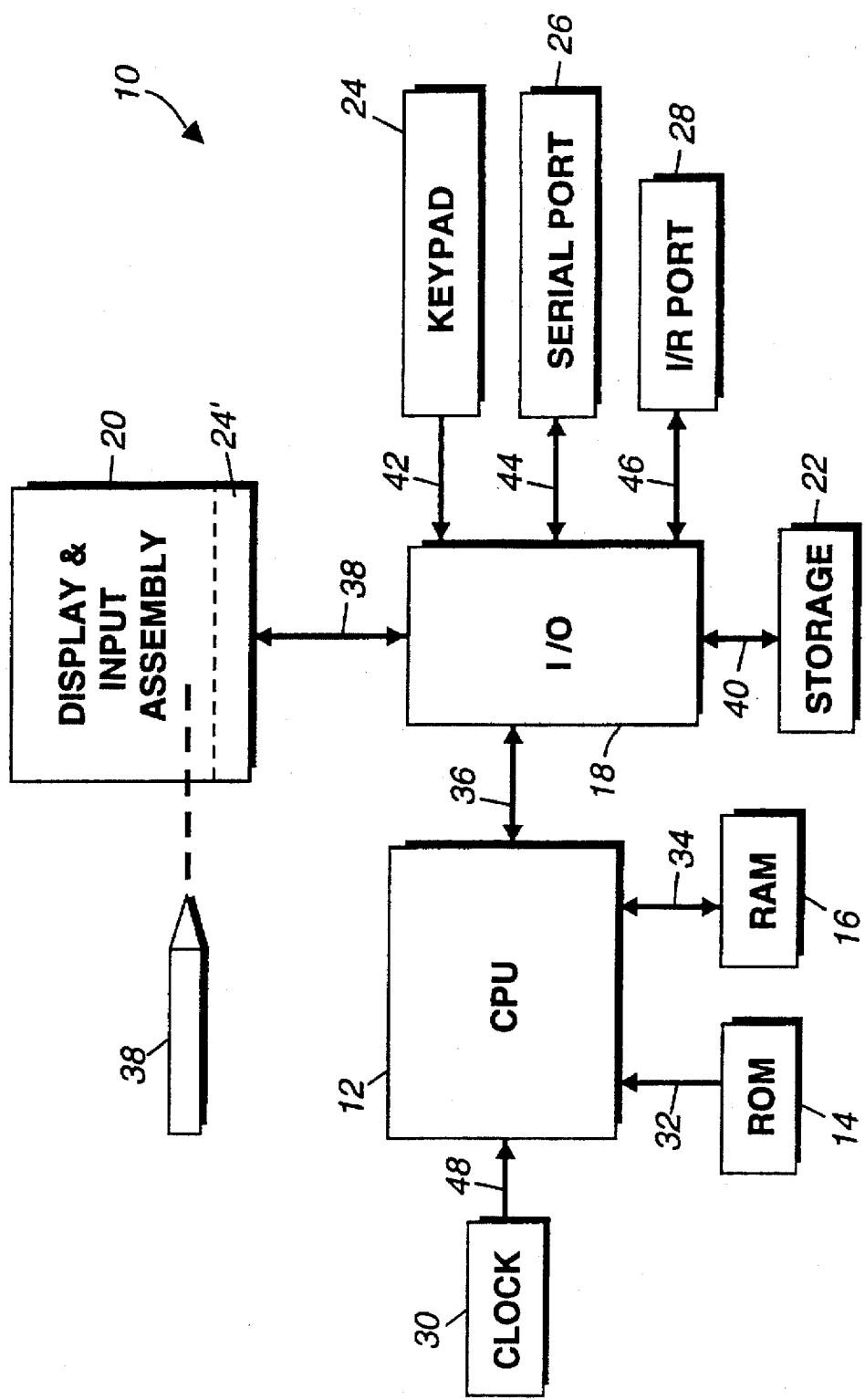
FIG. 1 is a block diagram of a computer system suitable for implementing the present invention.

As shown in FIG. 1, a pen-based computer system 10 suitable for implementing the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 38. When operating as an output device, the display assembly 20 receives data from I/O circuitry 18 via bus 38 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
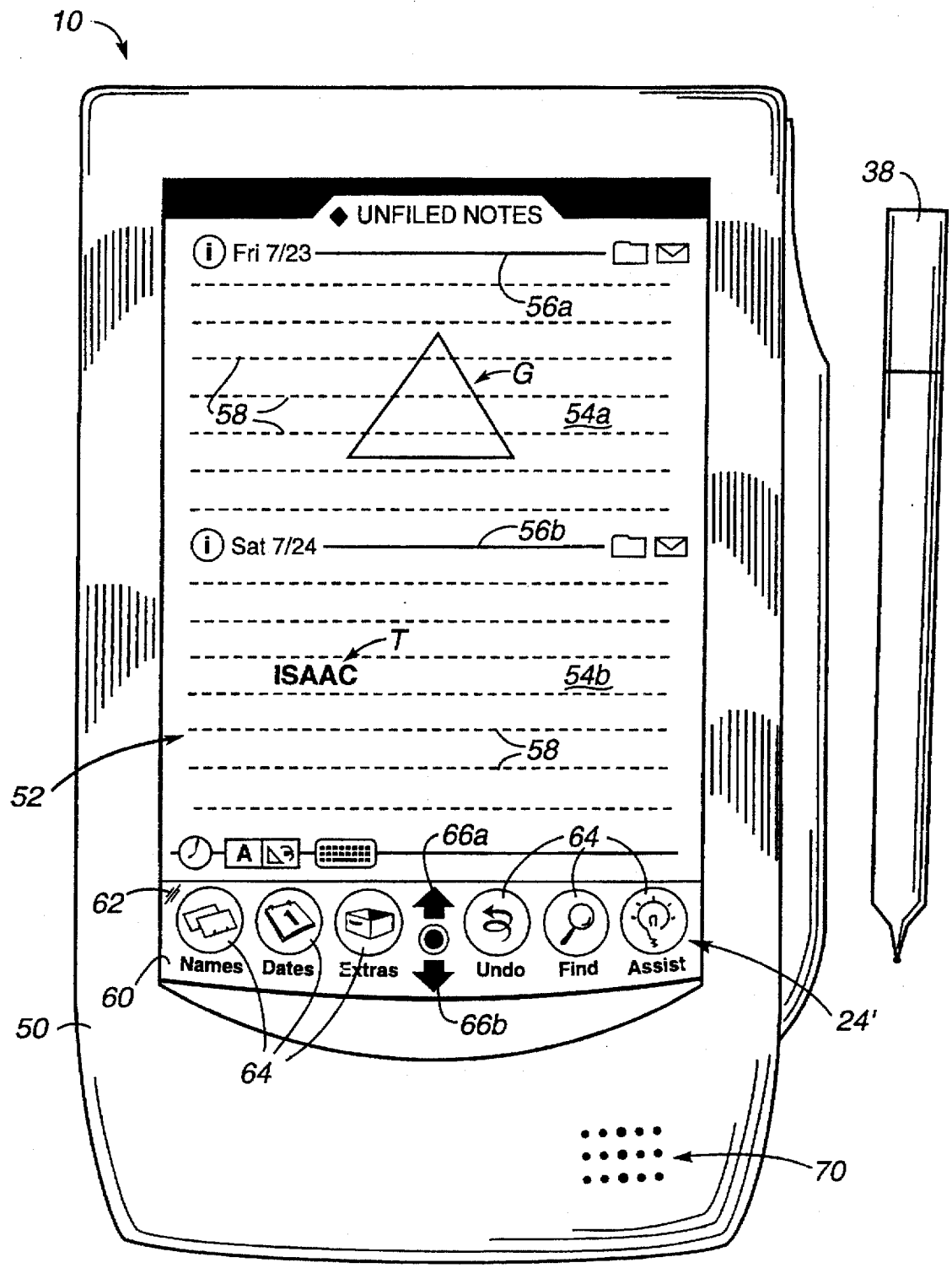
FIG. 2 is a top plan view of the screen, case, keypad, and stylus of the computer system shown in FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks. Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in co-pending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, now U.S. Pat. No. 5,588,105, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

It will be noted there is a liberal use of graphic elements in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, now U.S. Pat. No. 5,588,105, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

Figure 3B:
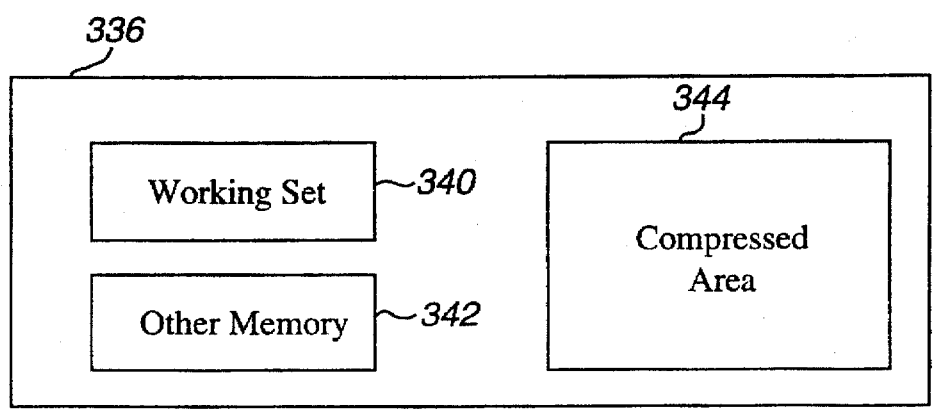
FIG. 3b is a block diagram of a primary storage (PS) device.

Referring next to FIG. 3b a primary storage device 336 in accordance with the present invention is shown. Initially, the present invention will be described in the context of a RAM device being the primary storage device 336. What is meant by RAM in the context of this application is that the primary storage device 336 can be read to and written from. As is seen in FIG. 3b, primary storage device 336 includes a working set (WS) 340, other memory (OM) 342 and a compressed area (CA) 344. The working set 340 is intended to store data. As will be discussed in detail later, working set 340 and compressed area 344 can grow and shrink dependent upon the data to be accessed. The other memory 342 is data that cannot be compressed or decompressed. Such data would normally include key operating system parameters and the like.

Using well known data compression techniques a significant amount of data can be compressed without affecting the operation of the computer. For example, using a 50% compression algorithm you can significantly increase the memory capacity even assuming some memory space is taken by the compression algorithm or code itself. Therefore, by judiciously managing what information is compressed and what information is not compressed at any given time, the computer system can effectively increase its memory capacity.

Figure 4:
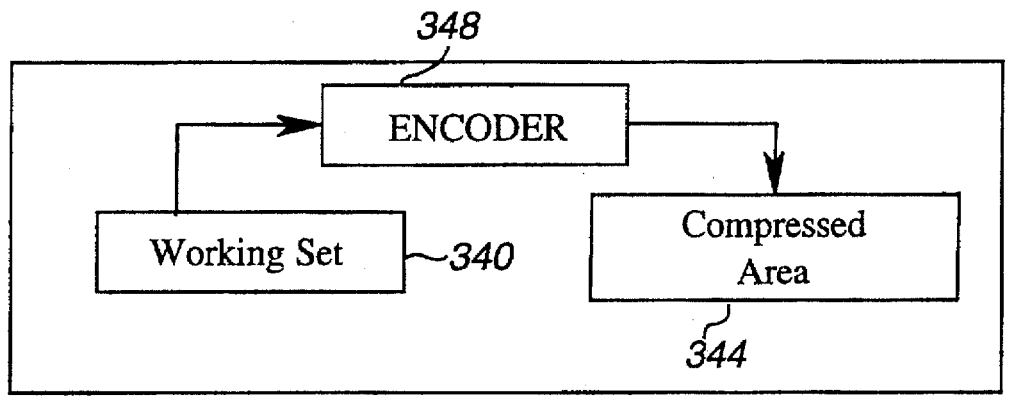
FIG. 4 is a block diagram showing the relationship between the compressed area and the working set of the primary storage device when compressing data.
Figure 5:
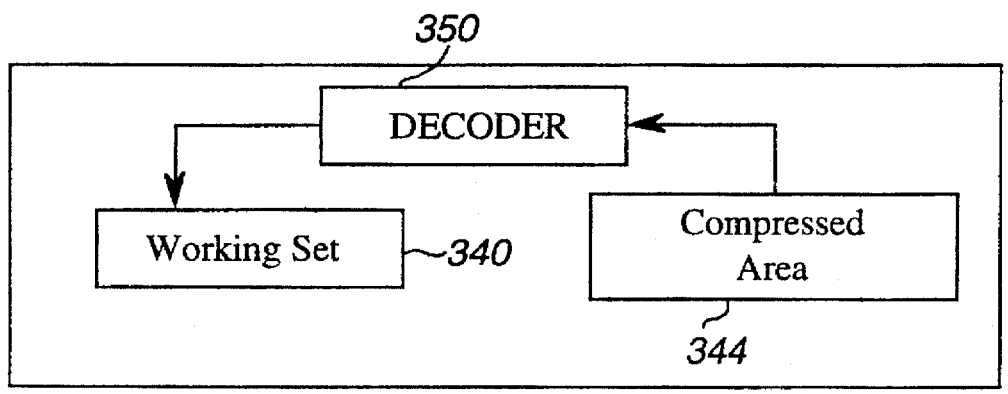
FIG. 5 is a block diagram showing the relationship between the compressed area and the working set of the primary storage device when decompressing data.
Figure 6:
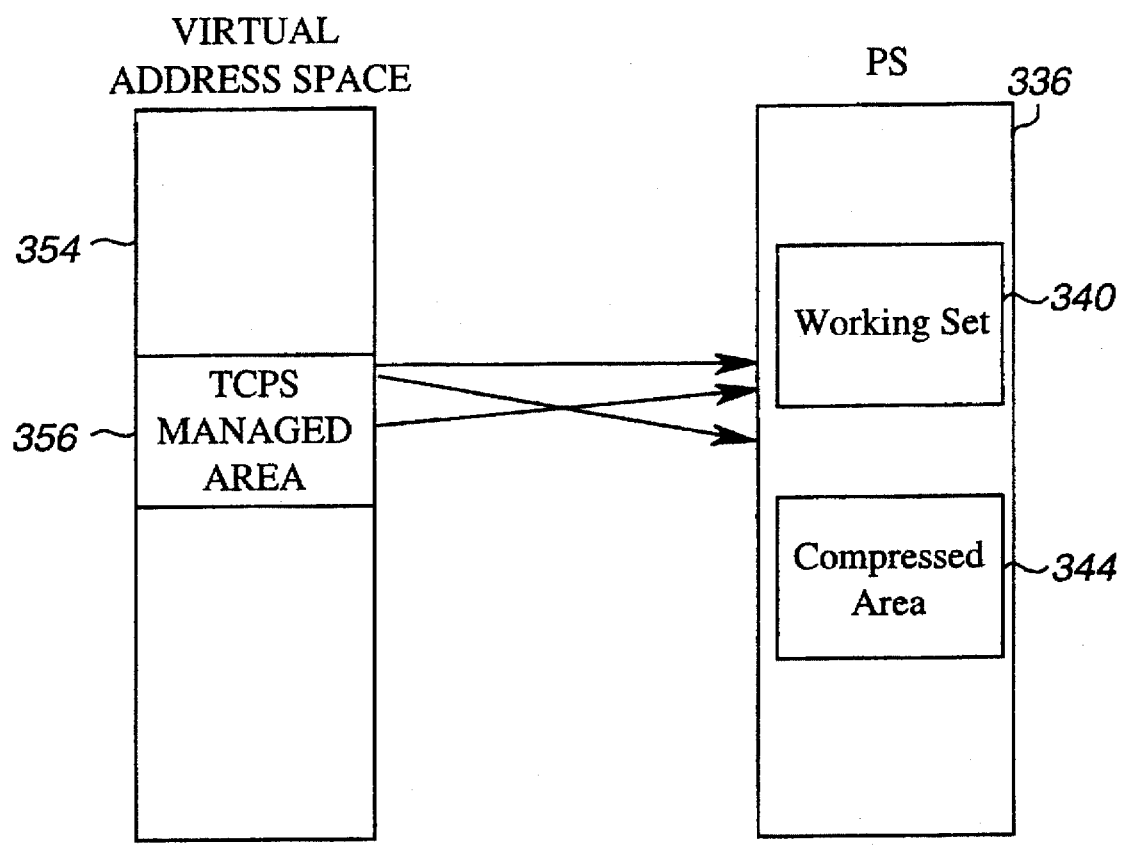
FIG. 6 is a block diagram of a virtual address space and the primary storage device.

The working set 340 of data in the primary storage device 336 is the information that is available to be accessed by the operating system's client. The compressed area 344 of the primary storage device 336 stores byte or word length data. As will be explained below, under certain conditions, the compressed data must be moved and placed into the working set 340. FIGS. 4 and 5 show the relationship between working set 340 and compressed area 344 in simple block diagram form. For compressing information from the working set, an encoder 348 applies a compression algorithm or encoding scheme to the working set 340 data to provide compressed data to compressed area 344 as shown FIG. 4. Similarly, in FIG. 5 a decoder 350 is utilized for decompressing data from the compressed area 344 to provide that data to working set 340.

Figure 8:
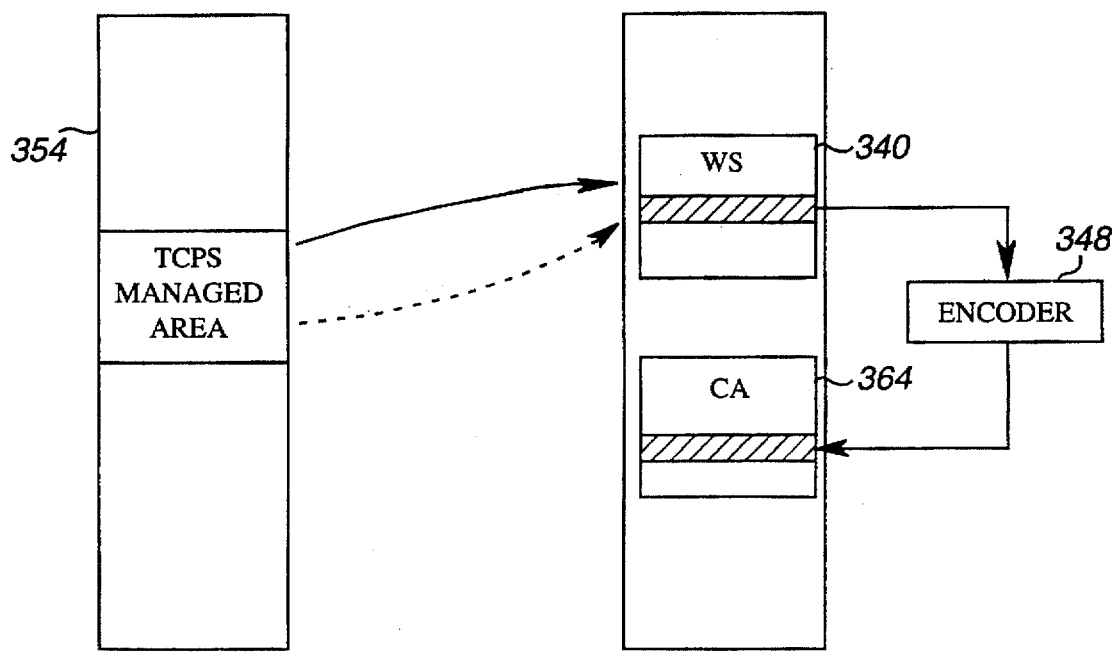
FIG. 8 is a block diagram which shows the compression of data when a fault occurs.

A memory management unit is provided to translate (map) virtual addresses into physical addresses. Since both the working set 340 and the compressed area 344 are found within the primary storage device 336, the memory management unit effectively manages the transfer of information between these two areas. The memory management unit includes a virtual address space 354, and as seen in FIG. 8, the virtual address space 354 includes a transparent compression of primary storage (TCPS) managed area 356. The TCPS managed area 356 effectively manages the transfer of data between the working set 340 and the compressed area 344. As seen by the user, the apparent behavior of the TCPS managed area 356 is the same as a non TCPS. Thus, the TCPS managed area 356 provides virtual to physical mapping transparently to the user. As will be apparent from the description that follows, through the cooperation of the TCPS managed area 356 with the working set 340 and compressed area 344 of the primary storage 336, a system is provided in which the primary storage 336 can be extended.

Figure 7:
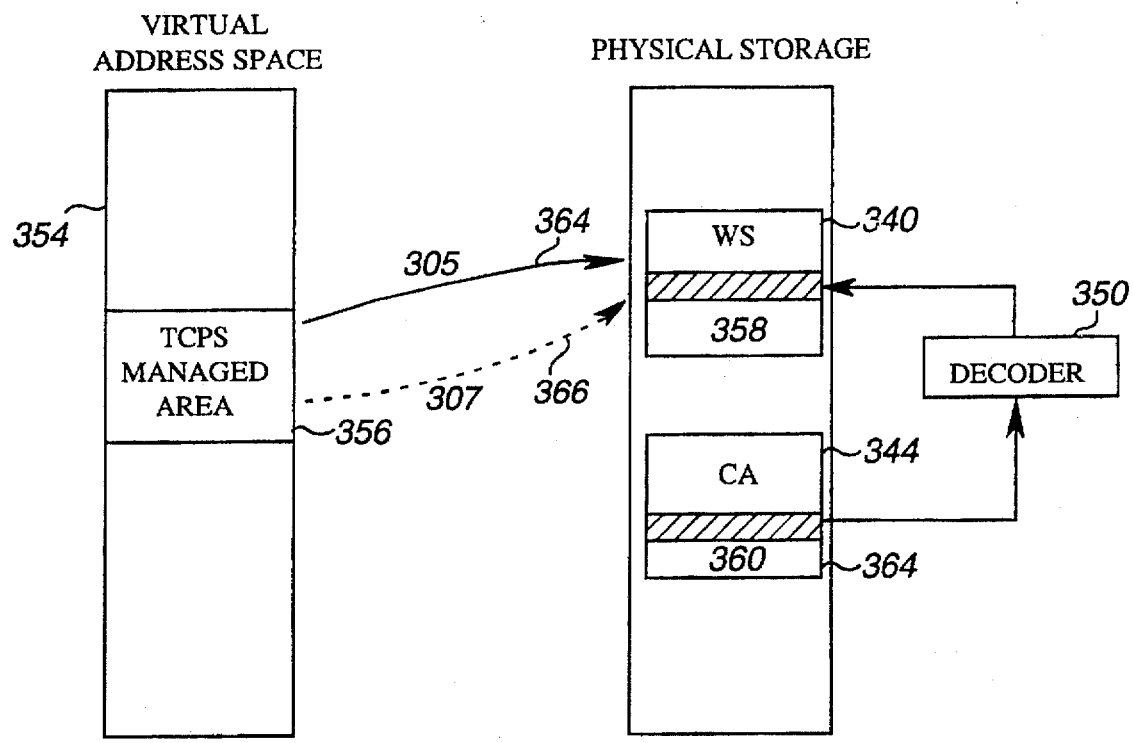
FIG. 7 is a block diagram which shows decompression of data when a fault occurs.
Figure 9:
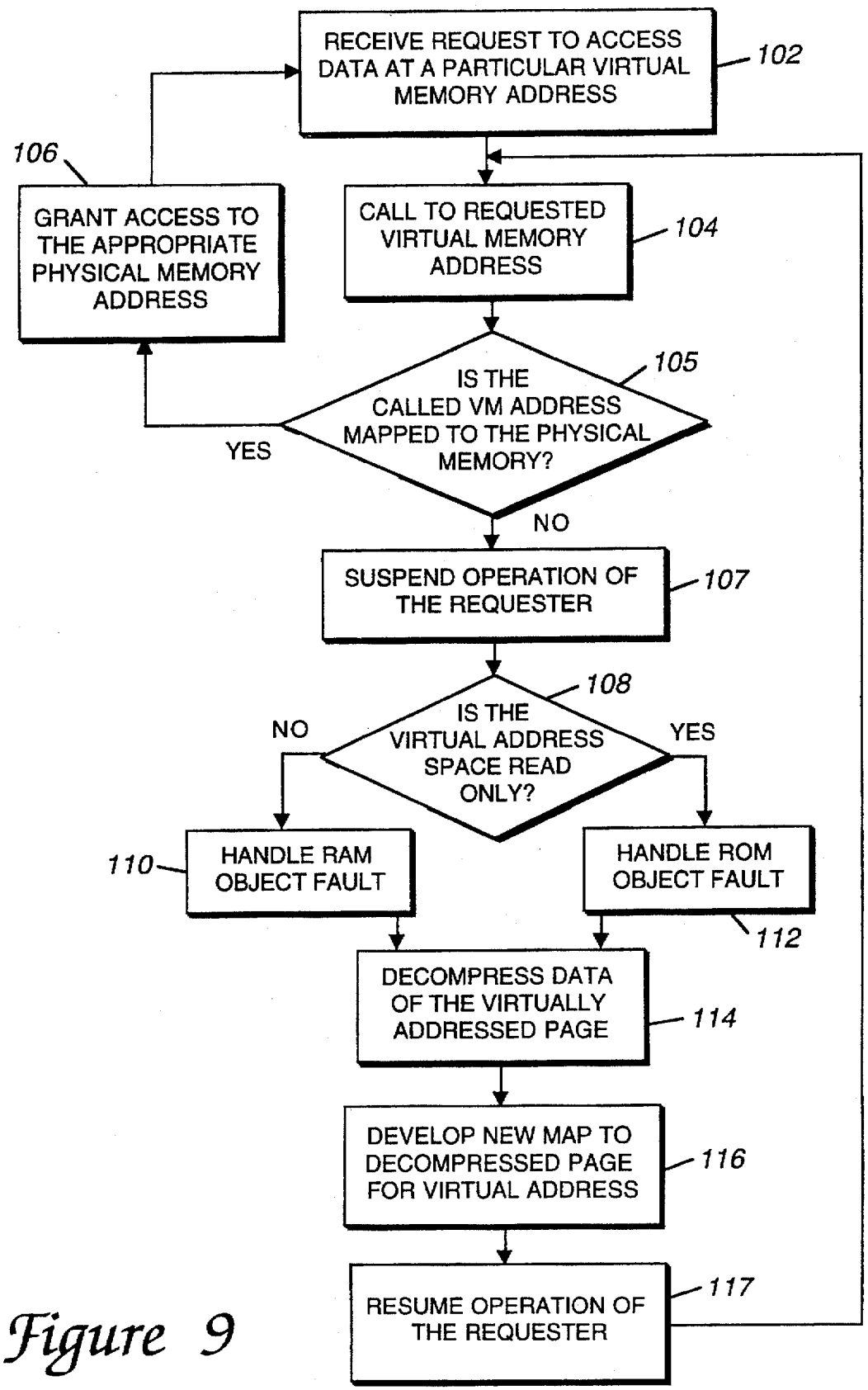
FIG. 9 is a flow diagram showing a method used to overcome faults in accordance with the present invention.

Referring next to FIGS. 7 & 9, the events that occur when a client of the operating system requests access to a designated virtual memory address that does not have a corresponding location within the working set 340 of primary storage device 336 will be described. FIG. 7 represents the process in block diagram form while FIG. 9 represents the process in flow diagram form. FIG. 7 shows the virtual address space 354 and the primary storage device 336. The virtual address space includes a TCPS managed area 356. Initially in step 102 a request is made to access a particular virtual memory address. The access request may take the form of either a read or a write operation. After the request is made, a call is made in step 104 to the memory management unit to access the requested address. In step 105, the memory management unit determines whether the called virtual memory address is mapped to the physical memory. This effectively asks whether the data referenced by the virtual memory address is in the working set. If so, access is granted to the appropriate physical memory address in step 106. If the data referenced in not mapped to the physical memory, a "fault" has occurred indicating that there is no place to read or write the data and the operation of the requester is suspended in step 107. This faulting is similar in nature to the faulting that occurs in prior art systems as previously described in the background section of the application.

After the operations have been suspended, the next task is to allocate a portion of the working set 340 to receive data 358. To accomplish this, the logic determines whether the called virtual address space is read only. If so, the logic moves to step 112 where it treats the fault as a ROM object fault as will be discussed in more detail below with reference to FIG. 10. If the called virtual address space is not read only, the fault is handled in step 110 as a RAM object fault as will be described in more detail below with reference to FIG. 11. Steps 110 and 112 are intended to free an area in the working set 340 to receive the addressed information in decompressed form. Then, in step 114, the compressed data is located in the compressed area 344 and the appropriate virtual addressed page is decompressed and stored in the released space. The decompression is accomplished by decoder 350. Of course, the actual decompression algorithm used in step 114 may be widely varied in accordance with the needs of a system as previously discussed. After the data has been stored, the logic moves to step 116 where the TCPS managed area is updated to map the decompressed page that has just been added to the working set 340. When RAM faults are involved, the memory space that had been used to store the transferred page within the compressed area will be deallocated as further described with reference to FIG. 10.

After the appropriate virtual address map has been developed, the normal operation of the requester is resumed in step 117 and the logic returns to step 104 where the call to the requested virtual memory address is remade. If the call is successful and the entire called virtual memory address is mapped into the working set, the result of decision step 105 is to grant access. On the other hand, if the working set 340 still does not have all of the desired information, the described process of steps 104-117 will be repeated until the call is successful.

Figure 10:
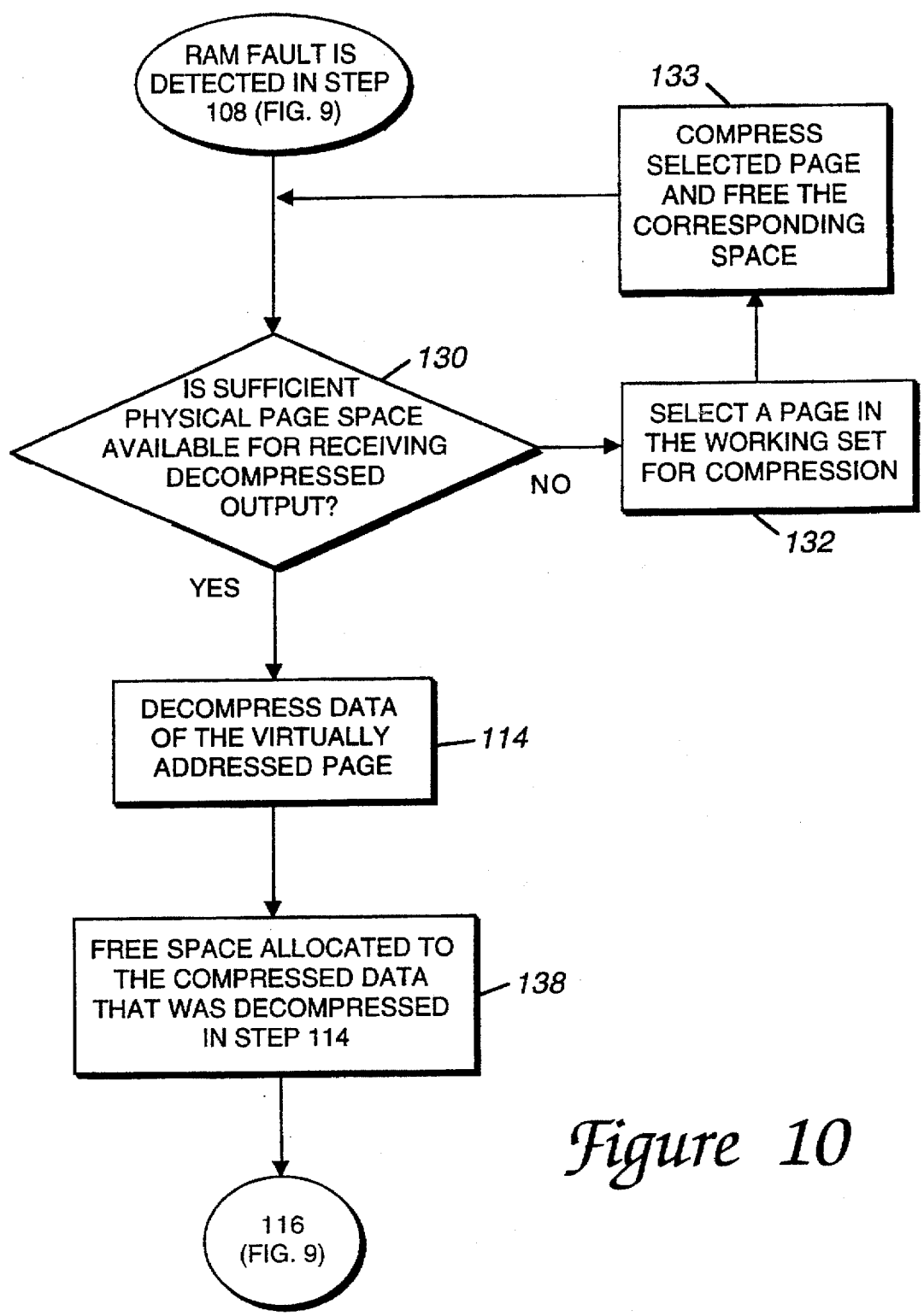
FIG. 10 is a flow diagram illustrating a method of handling a RAM object fault (step 110 in FIG. 9).

Referring next to FIGS. 8 and 10, the manner in which a RAM object fault is handled will be described in more detail. FIG. 8 is a block diagram which shows the compression of data within the working set in response to the need to allocate more space to data being placed into the working set. FIG. 10 is a flow diagram illustrating RAM fault processing step 110 in FIG. 9. When the result of decision step 108 (described with reference to FIG. 9) is that a ROM fault has not occurred, the system will assume that a RAM object fault has occurred. When a RAM fault is detected, the logic will know that the desired information is not available in the working set 340 (where it would be in decompressed form), but it is available in the compressed area portion 344 of the primary storage 336. Therefore, the logic first moves to step 130 where it determines whether there is sufficient physical page space available to receive the decompressed output that corresponds to the virtually addressed page(s). In essence the system is determining the amount of memory space that must be allotted to receive the requested page(s) of data. If there is sufficient space, the logic will simply move to step 114 where it will decompress the data of the appropriate (i.e. virtual addressed) page as discussed above with respect to FIG. 9. On the other hand, in many cases, there will not be sufficient free space in the physical memory to receive a new decompressed page. In such cases, the system must first compress some information that is in the working set 340 (i.e. information that is currently in decompressed form) and move it into the compressed area 344 in order to free up sufficient memory to receive new data into the working set. The compression is accomplished by encoder 348 as discussed with reference to steps 132 and 133.

More specifically, in step 132, the logic selects a page in the working set for compression. The actual manner in which a page will be selected for compression may vary widely from system to system. However, preferably the page selected for compression is a page that is not expected to be used soon. One appropriate algorithm for determining which page to recompress would be to select the page that had not been accessed for the longest period of time, i.e. the least recently used page. Once an appropriate page has been selected, its contents are compressed by encoder 348, tagged and then moved into the compressed area portion 344. (Step 133). At the same time, the space in the working set that was formerly occupied by the compressed data is released. It should be appreciated that even though the information is still stored within the primary storage device, its compression will provide a net increase in the available memory.

At this point, step 130 is repeated to determine whether there is now sufficient physical page space to receive decompressed output. If no, steps 132-133 are repeated until enough space is available. When sufficient space is available, the logic moves to step 114 as previously discussed. That is, in step 114 the data in the virtual addressed page is decompressed and stored in the freed space. At this point, the information will be stored in two places. Therefore, in a preferred embodiment, an additional step 138 of releasing the space allocated to the compressed data that was decompressed in step 114 is executed thereafter. With such an arrangement, the relative sizes of the working set and compressed area will be able to fluctuate in order to maximize efficiency. Of course after the transfers and releases have been made, the logic moves on to step 116 where the TCPS managed area updates its mapping.

Figure 11:
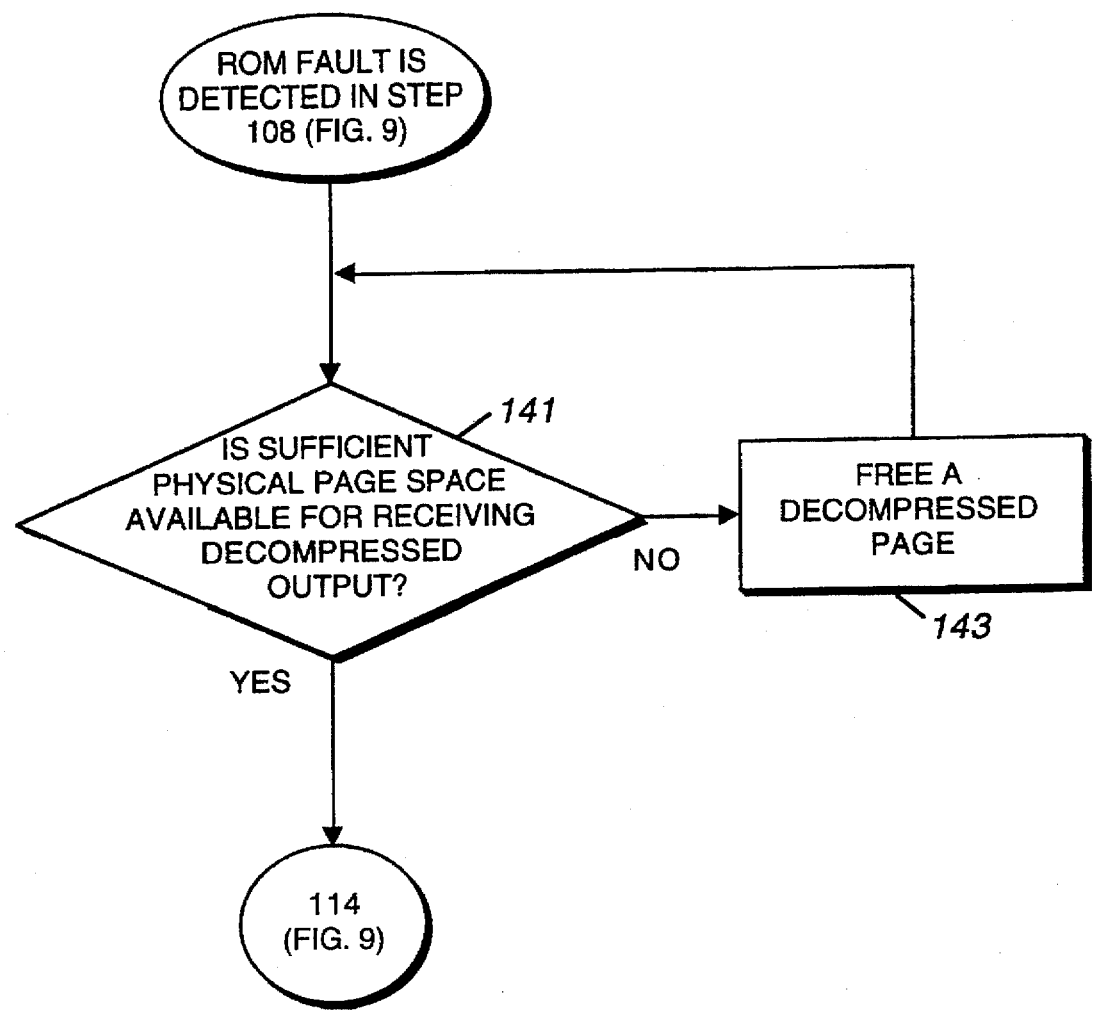
FIG. 11 is a flow diagram illustrating a method of handling a ROM object fault (step 112 in FIG. 9).

Referring next to FIG. 11 a suitable method for handling a ROM object fault condition will be described. In contrast to RAM object faults, when a ROM object fault is detected, it is known that the data associated with all pages is available in compressed form. Accordingly, if the working set is full, an arbitrary page in the working set that is associated with the ROM material is released. A typical algorithm for selecting the released material would cause the least recently used data in the working set to be selected. Since there is always a valid form of the data in compressed form, the handling of the ROM object fault case is therefore simpler than the RAM fault case. This is because there is no need to compress data before releasing a decompressed page in the working set.

The processing of a ROM fault begins in step 108 when the ROM fault is detected. When such a fault is detected, the logic first moves to step 141 where the logic determines whether there is sufficient physical page space available to receive the decompressed output of the virtually addressed page into the working set. If enough free memory is available, the logic moves directly to step 114 where the data of the virtual addressed page is decompressed as described above with reference to FIG. 9. On the other hand, when the result of step 141 is the determination that there is not enough available physical memory to simply receive a decompressed page, the logic moves to step 143 where a selected one of the decompressed pages that is found in the working set will be released. To release a page, its associated physical address space is taken, the mapping is destroyed, and a new (revised) map is added. From the viewpoint of the computer system, the information in the page corresponding to the physical address space that has been unmapped is effectively thrown away. The algorithm used to select the release page may vary widely. By way of example, a typical algorithm for performing this selection would cause the memory that holds the least recently used data in the working set to be released. Once enough decompressed space is available, the logic continues to step 114 with the decompression of the virtual addressed data.

Figure 12:
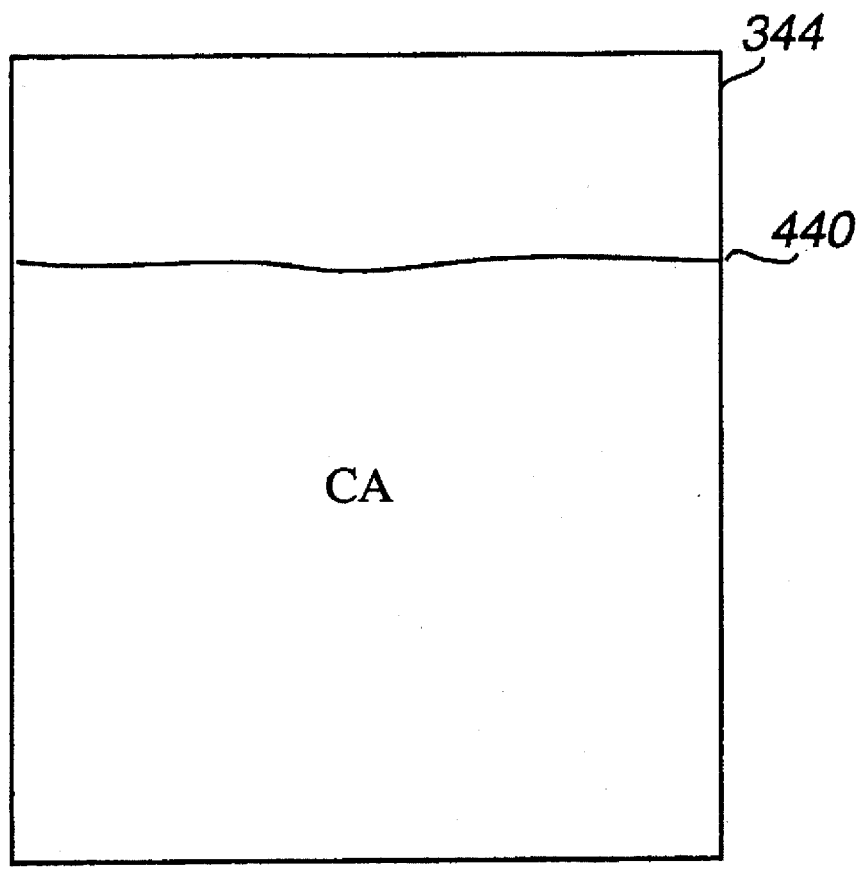
FIG. 12 is a block diagram showing a compressed memory area utilized in the present invention.
Figure 13:
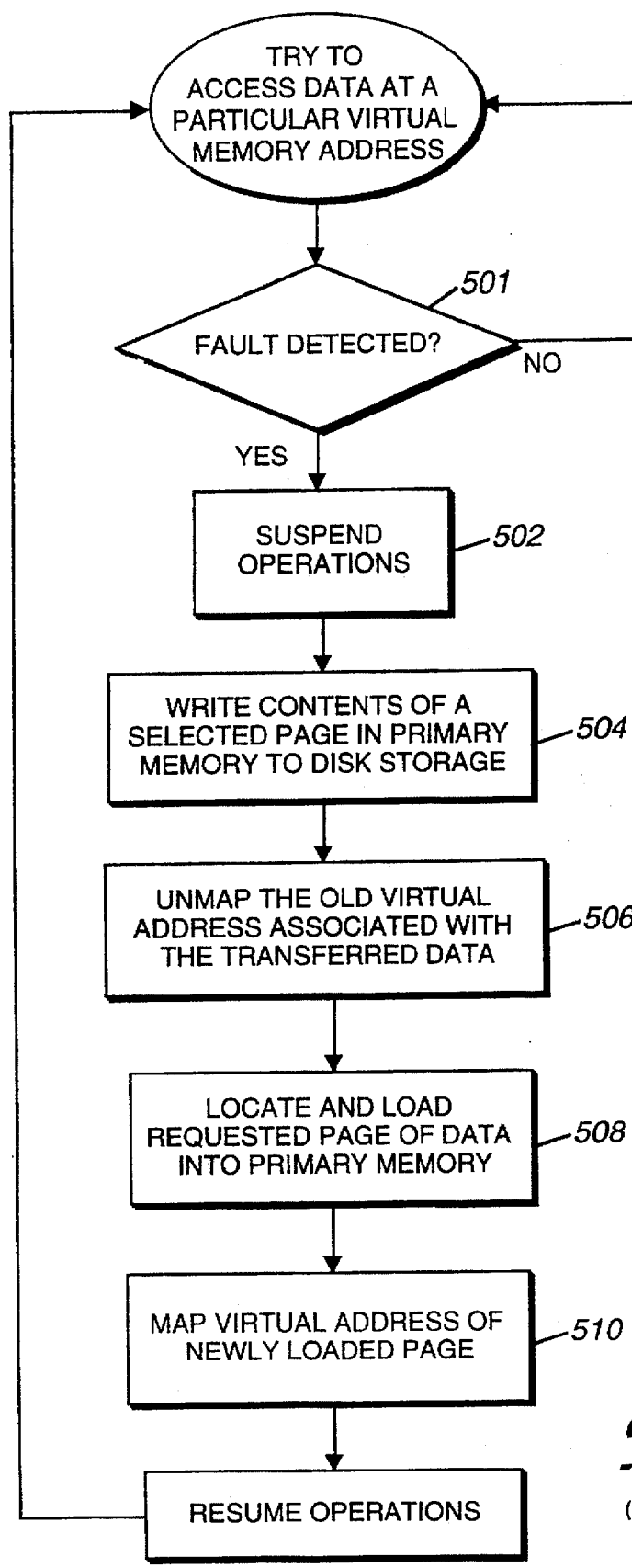
FIG. 13 is a flow diagram showing the operation of a memory management system in accordance with the prior art.
Figure 14:
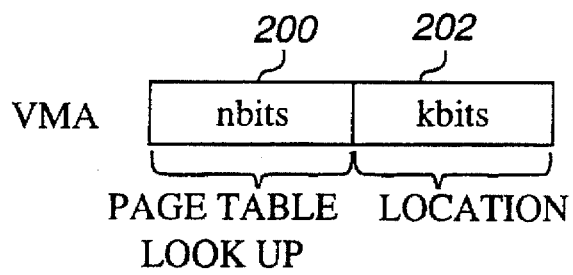
FIG. 14 is a block diagram showing a virtual memory address.
Figure 15:
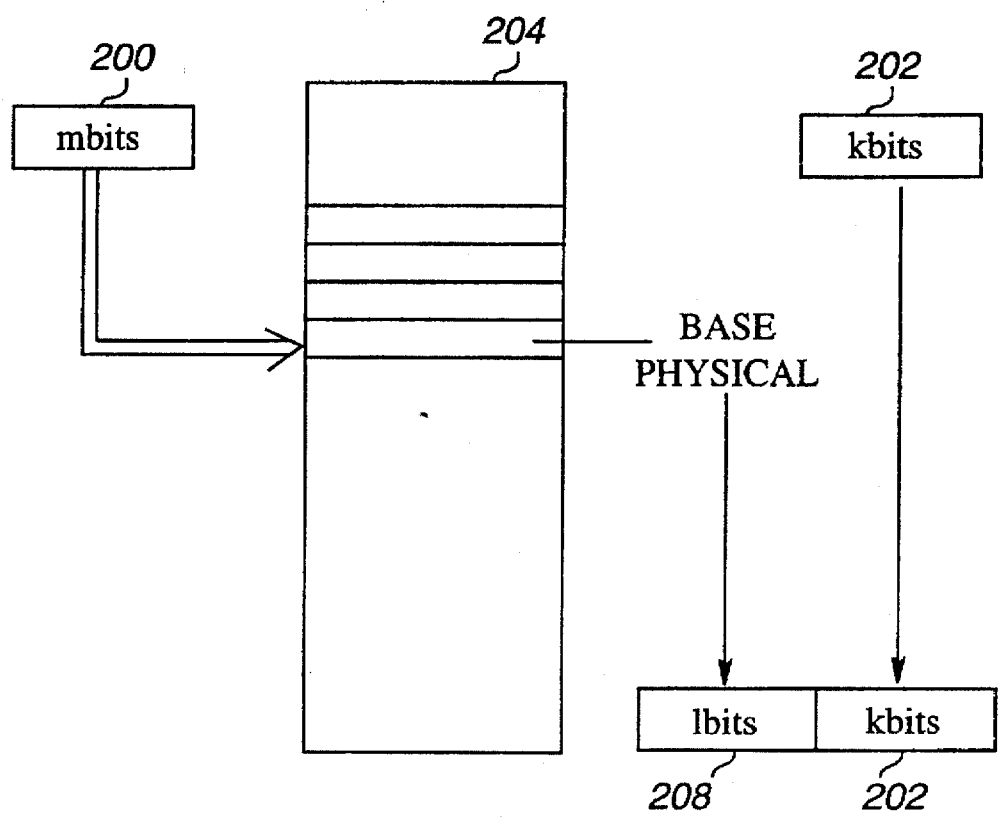
FIG. 15 is a diagram showing the conversion of a virtual memory address to a physical memory address.

Referring next to FIG. 12 the compressed area 344 of the described embodiment includes a water-line or limit 440 beyond which the compressed data should not exceed. That is, when the compressed area grows beyond a designated size, it will not be permitted to grow further. The reason for the limit is to insure that there is sufficient memory to prevent the computer from losing data during the execution of an operation. Accordingly, if the limit is ever hit, certain requests for new pages will be required to fail. On the other hand, there are some pages that can never be compressed, such as the compression code, operating system, etc. It should be appreciated that such a limit does not prevent operation of the computer system. For example, in the case of a RAM object fault, the decompressed copy is removed from the primary storage device only after compression. Similarly, a compressed copy is removed only after decompression (and preferably only if the decompressed data has been altered). Hence, there is always one accurate copy of the data within the memory.

Through the use of the described compression and fault handling techniques a system is provided that allows for the transparent compression of a primary storage device within a personal computer to extend the memory therein. In addition, through this system data integrity is preserved while utilizing less memory space than has been necessary in previously known systems. Although the present invention has been described in accordance with the embodiments shown in the figures, one of ordinary skill in the art recognizes that there could be variations to the embodiments and those variations would be within the spirit and scope of the present invention. Accordingly, many modifications may be made by one of ordinary skill in the art without departing from the spirit and scope of the invention, the scope of which is defined solely by the appended claims.

We claim:

1. In a personal computer, the personal computer including a central processing unit (CPU) and a primary storage device, the primary storage device including a plurality of physical addresses, a system for extending the memory of a primary storage area comprising:

means for mapping a plurality of virtual addresses into plurality of physical addresses;

means responsive to the mapping means for detecting that one of the plurality of virtual memory address should be mapped into one of the plurality of physical memory addresses;

managing means for managing a set of data information within the primary storage area;

means for determining a memory fault when said managing means does not have a requested virtual memory address currently mapped to the plurality of physical addresses of the primary storage area, and when the memory fault is detected, the mapping means locates the set of data information that corresponds to the requested virtual memory address that is associated with a compressed storage region of the primary storage area;

means for determining whether there is sufficient free space in a decompressed storage region of the primary storage area to receive the set of data information that corresponds to the requested virtual memory address in a decompressed format;

when there is not sufficient free space in the decompressed storage region of the primary storage area, a set of decompressed data is compressed and moved out of the decompressed storage region and into the compressed storage region when the set of data information that corresponds to the requested virtual memory address is moved and decompressed out of the compressed storage region of the primary storage area and swapped into the decompressed storage region of the primary storage area; and means for mapping the set data information to reflect the changes in the primary storage area after the swapping of the set of data information between the compressed storage region and the decompressed storage region.

2. The system of claim 1 which the mapping means comprises a memory management unit.

3. The system of claim 1 in which a compressed set of data information is stored within the compressed storage region and a decompressed set of data information is stored within the decompressed storage region.

4. The system of claim 3 wherein the personal computer is a portable personal computer including the CPU and the primary storage device, and not including a secondary storage device.

5. A method of handling faults in a computer system that includes a primary storage device, and a memory management unit for mapping virtual addresses to physical addresses within a working area that is divided into a working set that contains data that can be compressed and a non-compression area that contains data than can not be compressed, comprising the steps of:

(a) partitioning the primary storage device into a compressed area and a working area, the compressed area storing compressed data and the working area storing decompressed data;

(b) determining if a data access fault has occurred and whether the fault is a read only memory (ROM) object fault when attempting to access a block of the decompressed data stored in the working area of the primary storage device; and (b-i) handling a random access memory (RAM) object fault if the fault determining step indicates that the fault is not a ROM object fault; and (b-ii) handling a ROM object fault if the fault determining step indicates the ROM object fault:

(c) decompressing a compressed block from the compressed area of the primary storage device to produce a decompressed block if a data fault has occurred;

(d) determining if any decompressed data within the primary storage device must be removed or compressed to allow for additional space in the primary storage device;

(e) swapping the decompressed block with decompressed data contained within the working area such that the decompressed data is compressed and moved into the compressed area when it is determined that the decompressed data must be removed or compressed; and (f) developing a new virtual memory map.

6. The method of claim 5 in which the RAM object fault handling step further comprises the steps of:

(a) determining if a page of memory is available for decompression, if a page is not available a decompressed page is selected from memory and compressed, if a page is available for decompression then the page is decompressed;

(b) freeing a decompressed page from memory; and (c) mapping the decompressed page to virtual address.

7. The method of claim 5 in which the ROM object fault handling step further comprises the steps of:

(a) freeing a decompressed page from memory; and (b) mapping a new decompressed page to a virtual address.

8. A method of handling faults in a computer system that includes a primary storage device, and a memory management unit for mapping virtual addresses to physical addresses within the working area, wherein a fault is defined to occur when a request is made to the memory management unit to access data at a particular virtual memory address but the memory management unit does not have the requested virtual memory mapped to physical memory in the primary storage device, the method comprising the steps of:

partitioning the primary storage device into a compressed area and a working area, the compressed area storing compressed data and the working area storing decompressed data;

locating the data that corresponds to the requested virtual memory address in the compressed area and determining whether there is sufficient free space in the working area to receive the addressed data in decompressed form;

when there is not sufficient free space, releasing physical memory space in the working area under the condition that the data within the released physical memory space must be stored in compressed form in the compressed area;

decompressing the date that corresponds to the requested virtual memory address and storing the decompressed data in the working area; and developing a mapping in the memory management unit that reflects the changes in the working area.

9. A method of handling faults in a computer system as recited in claim 8 wherein when data is transferred from the compressed area to the working area, the physical memory space in the compressed area that had been used to store the data in compressed form prior to the transfer is released.

10. A method of handling faults in a computer system as recited in claim 8 wherein the working area of the physical memory is arranged in page blocks and the data transferring and memory releasing steps are done on a page basis.

11. A method of handling faults in a computer system as recited in claim 10 wherein when there is not sufficient free space in physical memory to receive the decompressed data into the working area, the method further comprises the steps of:

a) selecting a page in the working area for compression;

b) compressing the selected page; and c) releasing the physical memory space in the working set associated with the compressed page.

12. A method of handling faults in a computer system as recited in claim 11 wherein after a page of data has been compressed, said method comprises the further step of:

d) determining whether there is now sufficient physical memory space available to receive the decompressed data is performed, and wherein when there is still not sufficient available physical memory space, the steps a–d are repeated until sufficient physical memory space is available.

13. A method of handling faults in a computer system as recited in claim 8 wherein the released physical memory space is the least recently addressed space in working area that is permitted to be released.

14. A method of handling faults in a computer system as recited in claim 8 further comprising the steps of suspending operation of a requester when a fault is detected and resuming operation of the requester when the fault is corrected.

15. A method of handling faults in a computer system as recited in claim 8 wherein the computer system lacks a secondary storage device.

16. A method of handling faults in a computer system as recited in claim 8 wherein the primary storage device is a random-access semiconductor storage memory.

17. A virtual memory system for a computer system, comprising:

a random-access memory (RAM) partitioned into a main memory storage region and a secondary memory storage region, the main memory storage region storing data in a uncompressed format and the secondary memory storage region storing data in a compressed format;

a memory management unit for mapping virtual addresses to physical addresses, the physical addresses are addresses of the main memory storage region;

a processor for accessing and storing data to said RAM via said memory management unit using the virtual addresses such that data accessed or stored is accessed from or stored to the main memory storage region not the secondary memory storage region, wherein said virtual memory system has physical memory storage in the main memory storage region of said RAM which operates as a primary storage device, and said virtual memory system uses the secondary memory storage region of said RAM as virtual memory storage;

wherein a memory fault occurs when a request is made to said memory management unit to access data at a particular virtual address but said memory management unit does not have the requested virtual memory address mapped to the physical memory storage in the main memory storage region; and wherein during a memory fault, said memory management unit operates to perform the operations of:

locate the data that corresponds to the requested virtual memory address in the secondary memory storage region of said RAM which stores data in a compressed format;

determine whether there is sufficient free space in the main memory storage region of said RAM to receive the addressed data in the decompressed format;

when there is to sufficient free space, releasing physical memory space in the main memory storage region under the condition that the data within the released physical memory space must be stored in the compressed format in the secondary memory storage region;

decompress the data that corresponds to the requested virtual memory address and storing the decompressed data in the main memory storage region; and develop a mapping in said memory management unit that reflects the changes in the main memory storage region.

18. A virtual memory system as recited in claim 17, wherein said virtual memory system lacks a separate secondary storage device.

19. A virtual memory system as recited in claim 17, wherein the released physical memory space is at least recently addressed space in the main memory storage region that is permitted to be released.

20. A virtual memory system as recited in claim 17, further comprising suspending operation of a requester when the memory fault is detected and resuming operation of the requester when the memory fault is corrected.

* * * * *

UNITED STATES PATENT AND TRADEMARK OFFICE
CERTIFICATE OF CORRECTION

PATENT NO. : 5,696,926
DATED : December 9, 1997
INVENTOR(S) : Daniel J. Culbert, et al.

It is certified that error appears in the above-identified patent and that said Letters Patent is hereby corrected as shown below:

In the claims:

Claim 8 should read -- A method of handling faults in a computer system that includes a primary storage device, and a memory management unit for mapping virtual addresses to physical addresses within a working area that is divided into a working set that contains data that can be compressed and a non-compression area that contains data that can not be compressed, wherein a fault is defined to occur when a request is made to the memory management unit to access data at a particular virtual memory address but the memory management unit does not have the requested virtual memory address mapped to physical memory in the primary storage device, the method comprising the steps of:

partitioning the primary storage device into a compressed area and working area, the compressed area storing compressed data and the working area storing decompressed data;

locating the data that corresponds to the requested virtual memory address in the compressed area and making a determination as to whether there is sufficient free space in the working area to receive the addressed data in decompressed form;

when the determination indicates that there is not sufficient free space in the working area to receive the addressed data in decompressed form, releasing physical memory space in the working area such that the data within the released physical memory space is stored in a compressed form in the compressed area;

determining whether the data referenced by the virtual address is stored in read only memory (ROM), wherein when the referenced data is not stored in read only memory (ROM), the data within the released physical memory space is compressed and stored in the compressed area;

UNITED STATES PATENT AND TRADEMARK OFFICE
CERTIFICATE OF CORRECTION

PATENT NO. : 5,696,926
DATED : December 9, 1997
INVENTOR(S) : Daniel J. Culbert, et al.

It is certified that error appears in the above-identified patent and that said Letters Patent is hereby corrected as shown below:

decompressing the data that corresponds to the requested virtual memory address such that the decompressed data is swapped with the data that is stored in the compressed form in the compressed area, and storing the decompressed data in the working area; and
    developing a mapping in the memory management unit that reflects the changes in the working area.- -

Signed and Sealed this

Eleventh Day of April, 2000

Attest:

Attesting Officer

Q. TODD DICKINSON

Director of Patents and Trademarks